US007239237B2

(12) United States Patent
Hess (10) Patent No.: US 7,239,237 B2
(45) Date of Patent: Jul. 3, 2007

(54) HAND CRANK WEATHER CHANNEL RECEIVER WITH CELL PHONE CHARGER

(75) Inventor: Walter Hess, San Jose, CA (US)

(73) Assignee: Eton Corporation, Palo Alto, CA (US)

( * ) Notice: Subject to any disclaimer, the term of this patent is extended or adjusted under 35 U.S.C. 154(b) by 131 days.

(21) Appl. No.: 11/031,481

(22) Filed: Jan. 7, 2005

(65) Prior Publication Data
US 2006/0154690 A1 Jul. 13, 2006

(51) Int. Cl.
  G08B 1/08 (2006.01)
  G08B 21/00 (2006.01)
  G01W 1/00 (2006.01)
  H04M 1/00 (2006.01)

(52) U.S. Cl. .............................. 340/539.1; 340/539.28; 340/601; 340/636.1; 340/636.11; 455/550.1; 455/552.1; 455/573; 455/404.1; 342/26 R (58) Field of Classification Search ............. 340/539.1, 340/539.28, 601, 636.11; 455/573
See application file for complete search history.

(56) References Cited

U.S. PATENT DOCUMENTS

| 5,055,986 | A  | 10/1991 | Johnson |
| 5,465,198 | A  | 11/1995 | Kellogg |
| 6,238,061 | B1 | 5/2001  | McKenzie et al. |
| 6,536,917 | B1 | 3/2003  | Aperocho et al. |
| 7,019,492 | B1 * | 3/2006 | Baker et al. ................. 320/114 |

2004/0204180 A1* 10/2004 Liao ........................... 455/573

OTHER PUBLICATIONS

"Sidewinder Emergency Cell/Mobile Phone Charger," http://members.shaw.ca/sidewindercharger/, downloaded Jan. 4, 2005, 1 page.
"Solar/Dynamo (Hand Crank) Flashlight & AM/FM Radio," Dec. 30, 2004, http://preparedness.com/noname8.html, 2 pages.
"Hand Crank AM/FM Dynamo Radio & Lantern Light (No Batteries Needed)," http://www.store.yahoo.com/safetybuddy/amsoldynrad11.html, downloaded Jan. 3, 2005, 1 page.
"Solar/Dynamo Multi-Powered Digital Tune Multi-Band Radio with Clock," Mar. 25, 2004, http://www.survivalunlimited.com/radios/infomate.html, 2 pages.

(Continued)

Primary Examiner—Donnie L. Crosland
(74) Attorney, Agent, or Firm—Jones Day; Brett Lovejoy (57) ABSTRACT

An apparatus comprising a housing. A rechargeable battery source for providing a first source of direct current, a hand-crank dynamo configured to replenish the rechargeable battery source, and a direct current input receptacle configured for receiving a second source of direct current are disposed and held in the housing. An electric circuit is disposed and held in the housing and is in electrical communication with the rechargeable battery source and the direct current input receptacle to receive direct current from the first source of direct current or the second source of direct current. A cell phone charger output jack, in electrical communication with the electric circuit, is disposed and held in the housing. A radio receiver, disposed and held in the housing and in electrical communication with the electric circuit, is adapted to receive a National Oceanic & Atmospheric Administration or Environment Canada weather station.

18 Claims, 4 Drawing Sheets

OTHER PUBLICATIONS

"Dynamo Hand Powered Radio Clock," copyright 2003, downloaded from http://shop.store.yahoo.com/giftique-gifts/dynamoradio.html, 1 page.

"Clever Gear: Emergency Dynamo Radio (#52802)," http://www.clevergear.com/website/store/product_detail.asp?UID=&item_no=52802&keyw, downloaded Jan. 3, 2005, 2 pages.

"Radio—Solar Dynamo," copyright 1998-2001,downloaded from http://www.stacksandstacks.com/scripts/printable.html?view_sku=8942 and http://www.stacksandstacks.com/html/zoom8242.htm, 2 pages.

"AM/FM Shortwave Solar Dynamo Radio with Flashlight and Siren," downloaded from http://www.crystalbay.net/solar-radios/radio-lights.html Jan. 3, 2005, 2 pages.

"Kaito Solar AM FM SW Multiband Multi Powered Radio," downloaded from http://windupradio.com/KA007.htm Jan. 3, 2005, 2 pages.

"Hand Crank Dynamo AM/FM Flashlight," downloaded from http://www.sportsimportsltd.com/hacrdyamfl.html Jan. 3, 2005, 1 page.

"Next Generation! Hand-Crank Dynamo-Charging 7 LEDs Flashlight with Handy Charger for Mobile Phone/PDA/Digital Camera No Battery Required," copyright 2004, downloaded from http://www.allmediaoutlet.com/allmedia/led-flashlight-w-cell-phone-pda-digital-camer-cha, 3 pages.

"Solar and Dynamo AM/FM Radio," Dec. 26, 2004, downloaded from http://www.greenhome.com/products/appliances/radios_and_home_electronics/107232/, 1 page.

"Multi-Band Solar/Dynamo (Hand Generator) Radio/Light/Lantern," 2004, downloaded from http://www.safetycentral.com/mulsolbatpow.html, 1 page.

Eton Corporation Press Release, "Etón/Grundig Announces Availability of Battery-Free Emergency Radio," Apr. 9, 2003, 1 page.

Eton Corporation Press Release, "Etón's Grundig FR200 Receives Good Housekeeping's Good Buy Award: FR200 provides access to information and light when its needed most," Dec. 4, 2003, 1 page.

Eton Corporation Press Release, "Consumer Products Manufacturer Reports Surge in Sales of Emergency Radios," Aug. 15, 2003, 1 page.

Eton Corporation, "Grundig FR200: Emergency Crank Radio," 2003, downloaded from http://www.etoncorp.com/US/products/product.aspx?catid=3&subcatid=7&prodid=28 and http://www.etoncorp.com/US/products/product_specs.aspx?specs=true&prodID=28&catID=3&subCatID=7, 1 page.

Eton Corporation, FR200 and FR200G Operation Manual, Apr. 14, 2004, downloaded from http://www.etoncorp.com/us/resources/manuals/FR200_apr14.pdf, cover page and pp. 2-15.

* cited by examiner

HAND CRANK WEATHER CHANNEL RECEIVER WITH CELL PHONE CHARGER

FIELD OF THE INVENTION

This invention relates to a weather channel receiver or short wave radio receiver powered by a hand crank dynamo in combination with a cell phone charger.

BACKGROUND OF THE INVENTION

It is well recognized that hand held portable radios are an indispensable tool in emergency situations such as blackouts or natural disasters. Such radios can be used to obtain emergency information. Perhaps the best source of such information in the United States is the National Oceanic & Atmospheric Administration (NOAA) Weather Radio (NWR). NWR is a nationwide network of stations broadcasting continuous weather information direct from a nearby National Weather Service office. NWR broadcasts National Weather Service warnings, watches, forecasts and other hazard information twenty four hours a day. Working with the Federal Communication Commission's (FCC) Emergency Alert System, NWR is an "all hazards" radio network, making it a single source for weather and emergency information. NWR also broadcasts warning and post-event information for all types of hazards including natural (e.g., earthquakes, volcano activity, etc.) and environmental (e.g., chemical releases or oil spills). NWR is provided as a public service by NOAA, part of the Department of Commerce. NWR includes more than 900 transmitters, covering all 50 states, adjacent coastal waters, Puerto Rico, the U.S. Virgin Islands, and the U.S. Pacific Territories. NWR requires a special radio receiver or scanner capable of picking up the signal. Broadcasts are found in the public service band at seven specific frequencies 162.40 MHz, 162.42 MHz, 162.45 MHz, 162.47 MHz, 162.50 MHz, 162.52 MHz, and 162.55 MHz. The same channels are used in Canada by Environment Canada. Secondary sources of emergency information include AM stations, FM stations, and television bands.

Another indispensable tool in blackouts is a cell phone. Cell phones can be used to contact emergency assistance. Furthermore, cell phone usage can be tracked by cell phone operators to determine whether the phone has been used after a natural disaster. Such cell phone usage indicates that the cell phone account holder survived the natural disaster. However, cell phones are operated by batteries that require recharging. Newer cell phones, equipped with color screens and digital cameras, provide enhanced features at the expense of battery life. Thus, while cell phones are an indispensable tool in emergency situations, they have the shortcoming of needing frequent recharge—a resource that is simply not available in many emergency situations.

A number of devices have provided some emergency features. While many of these devices are useful in a variety of situations, each has certain drawbacks. For example, Innovative Solutions and Technologies, LLC (Bozeman, Mont.) markets a portable cell phone recharger, termed the Sidewinder, which includes a hand crank dynamo. Turning the crank handle at a speed of about two revolutions per second generates power that is used to recharge a cell-phone battery. One doesn't need to turn the crank at exactly two revolutions per second. Somewhat faster or slower is acceptable because the Sidewinder is voltage regulated to keep the voltage reasonably stable even if the generator speed varies. This Sidewinder also includes a miniature flashlight capability. There is a white LED on the top of the unit, and when the hand crank is turned, the generated power can either be used to recharge a cell phone or to turn on the light. A built in capacitor stores some charge so the light will continue to glow for a couple of minutes after a thirty second charge. While the Sidewinder provides useful functionality, it suffers from the drawback of having no radio receiver. Of course, such functionality could be obtained from a supplemental device, such as a portable weather radio. But this is undesirable because it requires one to carry multiple electronic devices in an emergency including a radio, a cell phone charger, and a cell phone. A more desirable emergency device would incorporate more essential features than those found in the Sidewinder into one single device in order to provide more effective emergency response assistance.

The Preparedness Center (Ukiah, Calif.) markets a solar powered, hand crank powered flashlight and AM/FM radio. Safety Buddy, Inc. (Irvine, Calif.) markets a hand crank AM/FM dynamo radio with a lantern light. However, each of these devices has the drawback that they are not equipped to receive NWR or television bands, and they do not have cell phone chargers.

Picou Builders Supply Company (Gonzales, La.) markets a solar and dynamo powered radio, termed the Info-Mate, that provides solar and dynamo powered FM, AM, shortwave, and NWR (WX) channels. However, this device has the drawback that it is not equipped to receive television bands, does not have a cell phone charger, and does not include a hand crank dynamo.

Giftique, Inc. (Lawrence, N.Y.) and The Johnson Smith Company (Bradenton, Fla.) each market a dynamo hand powered radio clock that includes FM and AM radio reception and a cell phone charger. The marketed device further includes an emergency alarm and flashlight. However, the device has the drawback that it does not receive NWR or television bands.

Stacks and Stacks (Richmond, Calif.) and CrystalBay (Fair Oaks, Calif.) each market a dynamo hand powered radio clock that includes FM, AM, NWR, and television band reception. The device further includes an emergency alarm and a flashlight. However, the device has the drawback that it does not have a cell phone charger.

China National Electronics Import and Export Shenzhen Company (Shenzhen City, Guangdong Province. China) manufactures the Kaito KA-006 and KA-007. The KA-007 is a dynamo hand powered radio clock that includes FM, AM, NWR, and television band reception. The KA-006 is a dynamo hand powered radio clock that includes FM and AM band radio reception. However, like the Stacks and Stacks device, the KA-006 and KA-007 have the drawback that they do not have cell phone chargers. The KA-006 has the further drawback that it does not include NWR or television band reception. The KA-006 and KA-007 each have the further drawback that they do not include a flashlight or alarm (e.g., a siren).

Green Home, Inc. (San Francisco, Calif.) markets a dynamo hand powered radio clock that includes FM and AM band reception. However, the device has the drawback that it does not have a cell phone charger. Preparedness Industries, Inc. (Ukiah, Calif.) markets a dynamo hand powered radio clock that includes FM, AM and NWR band reception. The device further includes an emergency alarm and a flashlight. However, the device has the drawback that it does not have a cell phone charger and it does not have television band reception.

In 2003, Eton (Palo Alto, Calif.) announced the availability of the FR200 emergency radio. The FR200 is dynamo hand powered radio that includes AM, FM, and shortwave radio band reception. The FR200 includes a flashlight that operates on power from the dynamo or three AA batteries. While the FR200 represents a significant advancement in the art of emergency devices, it has the drawback of not being able to receive television bands or the ability to recharge cell phones.

In addition to products currently present on the market, a number of efforts to provide emergency equipment have been described in various patents. For example, U.S. Pat. No. 5,055,986, entitled "Combination Light, Radio and Clock," to Johnson provides a device having a small incandescent light, a radio and clock, all housed within the same cabinet or housing. The light, clock and radio can be used during emergencies when energized by replaceable, rechargeable or non-rechargeable batteries. The Johnson device, while functional, is unsatisfactory. The device includes a power cord. Thus, although the radio will work on battery power, the presence of the power cord makes use of the radio as a portable emergency radio awkward. Furthermore, the light is on the front of the device. Given the flat design of the Johnson device, the positioning of the light on the front panel of the device makes operation of the Johnson device as a flashlight awkward. The Johnson device further has the drawback in that it is not adopted to receive television band or NWR band signals.

U.S. Pat. No. 5,465,198, entitled "Combination Clock Radio, Night Light and Power Receptacle," to Kellogg describes a combination appliance that includes the features of a radio, a clock and a light fixture and an electrical receptacle operated by alternating current. However, the Kellogg appliance is entirely reliant on household current and, as such, is wholly inadequate for emergency situations where device portability is needed.

U.S. Pat. No. 6,238,061 B1, entitled "Combination Lighting System, Alarm Clock, Radio and Television Having Secondary Power Supply," to McKenzie et al. describes a self-contained, portable, remote controlled combination television receiver, FM/AM radio receiver, clock and electric lamp. Alternative embodiments provide the lamp alone, the lamp and the radio receiver alone, or the lamp and the television receiver alone. Regardless, the McKenzie et al. device as described is bulky and has a power cord, making its use as an emergency device awkward in many emergency situations. For instance, the McKenzie device comes with a remote controlled device in order to control the lamp, radio, and television receiver suggesting the immobility of the device. And one suggested power source is a car battery. The McKenzie et al. device also provides no cell phone charger and no capability to receive NWR band signals.

U.S. Pat. No. 6,536,917 B1, entitled "Combination Flashlight and Two-way Radio," to Aperocho et al. describes a combination flashlight and two-way radio. The Aperocho et al. device includes a recharging control base that plugs into a conventional AC current source. While useful in its own right, the Aperocho et al. device fails to provide a cell phone charger or the ability to receive NWR or television band signals.

Given the above background, what is needed beyond the prior art are improved portable emergency devices that are useful in a broad array of emergency situations.

SUMMARY OF THE INVENTION

The present invention addresses the drawbacks found in prior art devices. One embodiment of the present invention provides a device in an integrated housing that includes a radio, which can receive AM, FM, NWR, and television bands, and an integrated cell phone charger. Another embodiment of the present invention provides a device in an integrated housing that includes a radio, which can receive AM, FM, short wave bands, and an integrated cell phone charger. The inventive devices, which include a built-in light source and ear phone jack, can be powered by an AC adaptor, by a hand crank dynamo, an internal rechargeable battery, or disposable batteries.

One aspect of the present invention comprises a device including housing with a rechargeable battery source disposed and held in the housing for providing a first source of direct current. The device further includes a hand-crank dynamo, disposed and held in the housing. The hand-crank dynamo is in electrical communication with the rechargeable battery source and is configured to replenish the rechargeable battery source. The device further includes a direct current input receptacle disposed and held in the housing. The direct current input receptacle is configured for receiving a second source of direct current. An electric circuit, disposed and held in the housing, is in electrical communication with the rechargeable battery source and the direct current input receptacle in order to receive direct current from the first or second source of direct current. The device further includes a phone charger output jack, in electrical communication with the electric circuit, disposed and held in the housing. The device further includes a radio receiver, in electrical communication with the electric circuit, disposed and held in the housing. In one embodiment, among other bands such as AM and FM radio, the radio receiver is adapted to receive a National Oceanic & Atmospheric Administration or Environment Canada weather station. In another embodiment, among other bands such as AM and FM radio, the radio receiver is adapted to receive short wave radio.

In some embodiments, the rechargeable battery source is a nickel-metal-hydride (Ni-MH) battery pack. In some embodiments, the Ni-MH battery pack has a voltage of about 3.6 volts DC and a milliamp-hour (mAh) rating between about 200 mAh and 800 mAh. In some embodiments, the device further comprises a power switch disposed and held in the housing. This power switch is in electrical communication with the cell phone charger jack so that (i) when the power switch is in a first position, the cell phone charger jack is energized and (ii) when the power switch is in a second position, the cell phone charger jack is not energized.

In some embodiments, a weather band switch is disposed and held in the housing of the device. This weather band switch is in electrical communication with the radio receiver. The weather band switch controls which National Oceanic & Atmospheric Administration or Environment Canada weather station is received by the radio receiver, and allows a user to select any one frequency from the group consisting of 162.40, 162.42, 162.45, 162.48, 162.50, 162.52, and 162.55 MHz.

In some embodiments, a power switch is disposed and held in the housing of the device. The power switch is in electrical communication with the radio receiver such that (i) when the power switch is in a first position, the radio receiver receives no direct current, (ii) when the power switch is in a second position, the radio receiver receives the first source of direct current, and (iii) when the power switch is in a third position, the radio receiver receives the second source of direct current.

In some embodiments an emergency switch, a first light emitting diode for emitting a white light, and a second light emitting diode for emitting a red light are each disposed and held in the housing of the device and in electrical communication with the electric circuit. When the emergency switch is in a first position, the first light emitting diode is powered, when the emergency switch is in a second position, the second light emitting diode is intermittently powered, and when the emergency switch is in a third position, the first light emitting diode and the second light emitting diode are not powered.

In some embodiments, the radio receiver is further capable of receiving AM, FM, and television signals. In such embodiments, the weather channel receiver apparatus further comprises a radio receiver switch disposed and held in the housing and in electrical communication with the electric circuit. When the radio receiver switch is in a first position, the radio receiver is adapted to receive an AM radio signal. When the radio receiver switch is in a second position, the radio receiver is adapted to receive an FM radio signal. When the radio receiver switch is in a third position, the radio receiver is adapted to receive a television band signal. Finally, when the radio receiver switch is in a fourth position, the radio receiver is adapted to receive the National Oceanic & Atmospheric Administration or Environment Canada weather station. In other embodiments, the radio receiver switch includes a first position for AM radio, a second position for FM radio, and a third position for short wave radio.

In some embodiments, the device further comprises (i) an alert switch and a siren, each disposed and held in the housing and in electrical communication with the electrical switch. In such embodiments, when the alert switch is in a first position, a siren is not sounded and when the alert switch is in a second position the siren is sounded. In some embodiments, the device further comprises a retractable telescopic antenna and a ferrite bar antenna disposed and held within the housing of the device. The retractable telescopic antenna and the ferrite bar antenna are in electrical communication with the radio receiver. In some embodiments, the device further comprises a headphone jack disposed and held within the housing and in electrical communication with the radio receiver. In some embodiments, when a headphone cord is inserted in the headphone jack, the headphone cord is used by the radio as an antenna in instances where the headphone cord is inserted in the headphone jack and the retractable telescopic antenna is in a retracted position.

In some embodiments, the device further comprises a tuning dial disposed and held within the housing. The tuning dial regulates a frequency to which the radio receiver is tuned. The tuning dial comprises a course tuning dial for course control of the frequency and a fine tuning dial, housed within the course tuning dial, for fine control of the frequency. In some embodiments, the apparatus further comprises a nonrechargeable battery source disposed and held in the housing for providing a third source of direct current. In such embodiments, when the electric circuit is in electrical communication with the nonrechargeable battery source, the circuit provides a direct current from the first or second source of direct current, described above, or the third source of direct current. In some embodiments the direct current input receptacle is connected to the rechargeable battery source so that, when the direct current input receptacle receives the second source of direct current, the second source of direct current recharges the rechargeable battery.

Another aspect of the invention provides a weather channel receiver apparatus comprising a housing and a rechargeable battery source disposed and held in the housing for providing a first source of direct current. The apparatus further includes a hand-crank dynamo, disposed and held in the housing. The hand-crank dynamo is configured to replenish the rechargeable battery source. The hand-crank dynamo is in electrical communication with the rechargeable battery source. The apparatus further includes a direct current input receptacle disposed and held in the housing. The direct current input receptacle is configured for receiving a second source of direct current. The apparatus further includes a nonrechargeable battery source disposed and held in the housing for providing a third source of direct current. The apparatus further includes an electric circuit disposed and held in the housing. The electric circuit is in electrical communication with the rechargeable battery source, the direct current input receptacle, and the nonrechargeable battery source, in order to respectively receive direct current from the first source of direct current, the second source of direct current, or the third source of direct current. The device further includes a phone charger output jack disposed and held in the housing. The cell phone charger jack is in electrical communication with the electric circuit. The device further includes a radio receiver disposed and held in the housing. The radio receiver is adapted to receive a National Oceanic & Atmospheric Administration or Environment Canada weather station. This radio receiver is in electrical communication with the electric circuit.

Yet another aspect of the invention provides an apparatus comprising a housing and a rechargeable battery source disposed and held in the housing for providing a first source of direct current. This apparatus further includes a hand-crank dynamo disposed and held in the housing. The hand-crank dynamo is in electrical communication with the rechargeable battery source and is configured to replenish the rechargeable battery source. The apparatus further includes a direct current input receptacle disposed and held in the housing. The direct current input receptacle is configured for receiving a second source of direct current. An electric circuit is also disposed and held in the housing. The electric circuit is in electrical communication with the rechargeable battery source and the direct current input receptacle in order to receive direct current from the first source of direct current or the second source of direct current. The apparatus further includes a phone charger output jack disposed and held in the housing. The cell phone charger jack is in electrical communication with the electric circuit. The apparatus further includes a radio receiver, disposed and held in the housing. The radio receiver is adapted to receive shortwave bands, FM bands, and AM bands.

BRIEF DESCRIPTION OF THE DRAWINGS

Like reference numerals refer to corresponding parts throughout the several views of the drawings.

DETAILED DESCRIPTION

Figure 1:
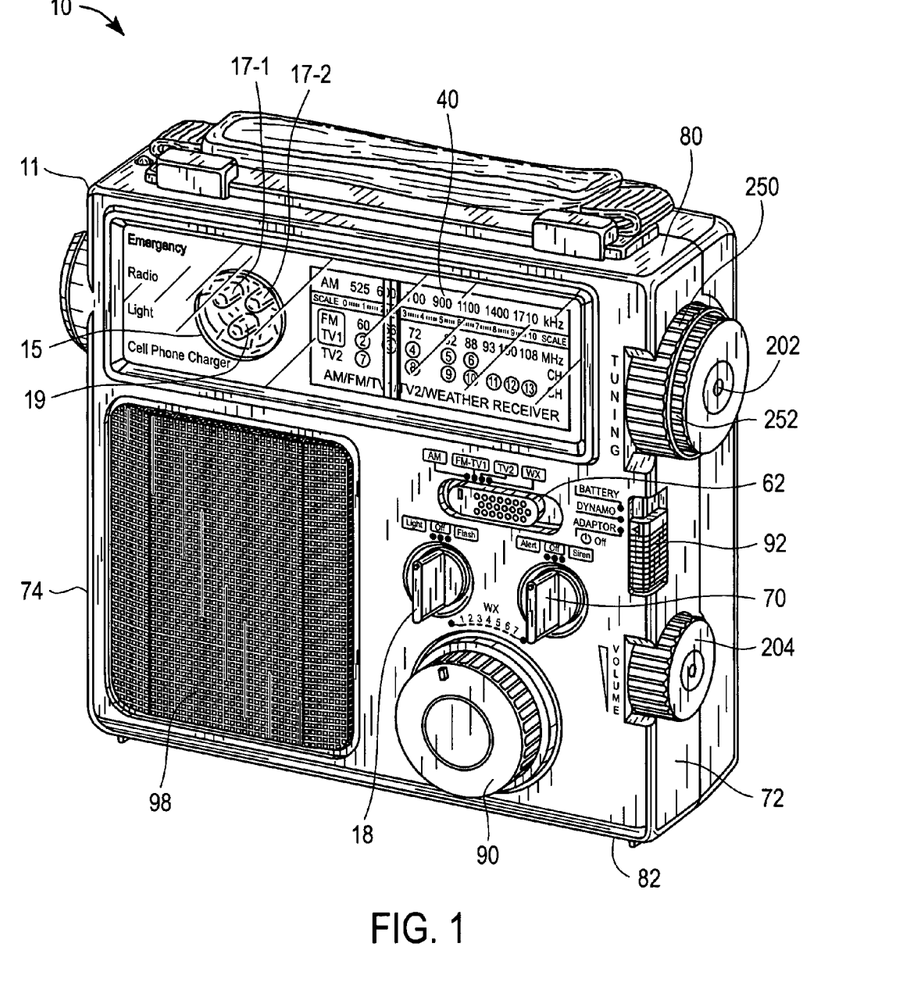
FIG. 1 is a first front perspective view of a preferred embodiment of an apparatus in accordance with the present invention.

FIG. 1 shows a preferred embodiment of the present invention, hereafter referred to in the alternative as apparatus 10. Apparatus 10 comprises a combined cell phone charger, lamp and radio receiver integrally contained within housing 11. In a preferred embodiment, housing 11 is generally rectangular as illustrated in FIG. 1. In a preferred embodiment, housing 11 has a metallic silver or metallic pearl finish. In other embodiments housing 11 has a colored finish, such as blue, white, or pink. However, the invention is not limited to such finishes and any suitable casing finish is within the scope of the present invention. The embodiment illustrated in FIG. 1, which is not drawn to scale, has dimensions of approximately 6.7 inches in width (as measured from side 74 to side 72) a height of approximately 6.5 inches (as measured from bottom 82 to top 80), and has a depth of approximately 2.5 inches. While the invention is not limited to such dimensions, in preferred embodiments, apparatus 10 is dimensioned and configured so that it can easily be hand carried. In some embodiments of the present invention, apparatus 10 weighs between 0.8 pounds and 2 pounds. The embodiment illustrated in FIG. 1 weighs 1.3 pounds.

The lamp section of apparatus 10 comprises illumination source 15. In preferred embodiments, illumination source 15 includes two white light emitting diodes (LEDs) 17 and a red LED 19. An emergency switch 18 is used to regulate LEDs 17 and 19. Emergency switch 18 can be switched into three different positions. When emergency switch 18 is in a first position, LEDs 17 are powered and emit a white light. When emergency switch 18 is in a second position, LED 19 is intermittently powered to emit a flashing red light. When emergency switch 18 is in a third position, LEDs 17 and 19 are not powered and emit no light.

In one embodiment, apparatus 10 includes radio signal receiving and processing circuitry (a radio receiver), a tuning dial 202, a volume control 204, a display 40 (FIG. 1) for indicating the frequency to which the radio is tuned, and an AM/FM/television/NWR radio receiver switch 62 to control whether the radio is tuned to an AM, FM, television, or NWR band. More specifically, when radio receiver switch 62 is in a first position, the radio receiver is adapted to receive an AM radio signal. When radio receiver switch 62 is in a second position, the radio receiver is adapted to receive an FM radio signal. When radio receiver switch 10 is in a third position, the radio receiver is adapted to receive a television band signal (e.g., VHF channels 2-13). When radio receiver switch 62 is in a fourth position, the radio receiver is adapted to receive the National Oceanic & Atmospheric Administration or Environment Canada weather station. In some embodiments, radio receiver switch selects between AM/FM and shortwave bands rather than AM/FM/television/NWR bands.

Figure 2:
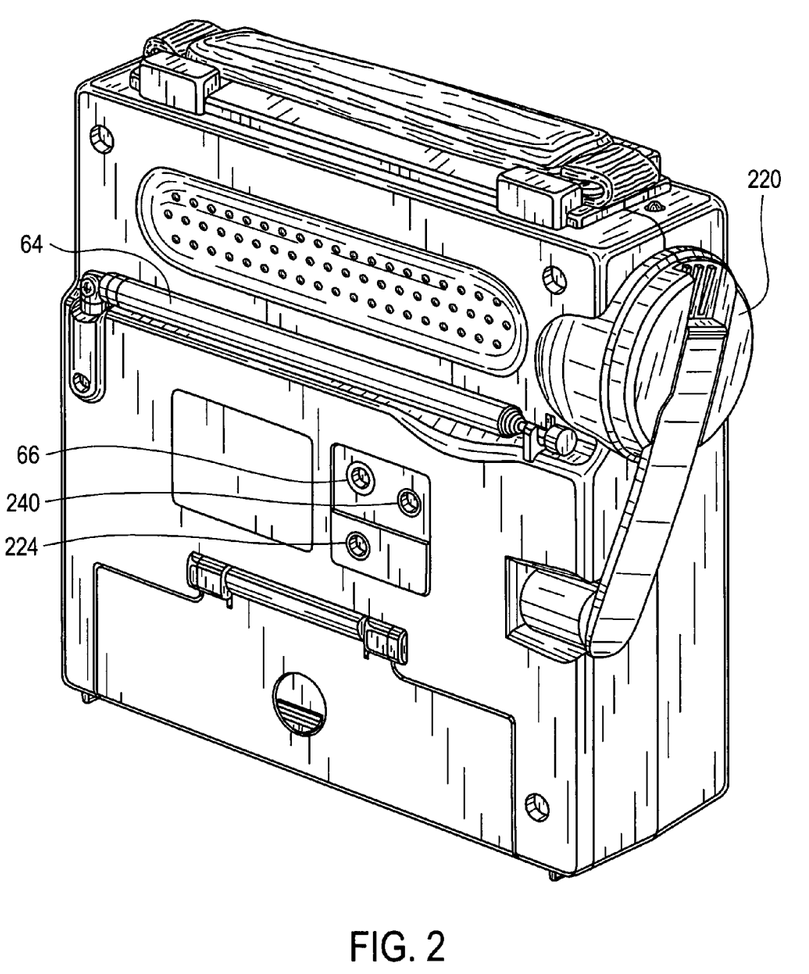
FIG. 2 is a rear perspective view of this preferred embodiment.

Referring to FIG. 2, apparatus 10 further includes an antenna including a built in ferrite bar antenna (not shown) for AM radio reception and a telescoping antenna 64 for FM radio reception. Referring back to FIG. 1, advantageously, tuning dial 202 comprises a course tuning dial 250 for course control of the frequency used by the radio receiver and fine tuning dial 252, housed within course tuning dial 250, for fine control of the frequency used by the radio receiver.

Apparatus 10 includes an alert switch 70 for sounding a siren disposed and held in housing 11 (not shown). When alert switch 70 is in a first position (e.g., off position), the siren is not sounded. When alert switch 70 is in a second position (e.g., on/siren position) the siren is sounded. Siren 70 is sounded using an amplifier and speaker 98. In some embodiments, button 70 has an additional third position (e.g., alert position). In one embodiment, when button 70 is set in the third position ("alert mode"), the radio is set to an off state when current is available to direct current input receptacle 240 at the back of apparatus 10 and the radio is set to an on state when direct current is not available to receptacle 240. Thus, a user can use apparatus 10 in a variety of emergency and non-emergency situations. The alert setting of switch 70 can be used in those situations where one desires the radio to "turn on" when there is a power outage. This feature is useful for localizing apparatus 10 during a power outage where visibility is likely to be reduced. In such instances, the radio acts as a beacon, helping people in the vicinity of the radio to find apparatus 10. In addition to helping localize apparatus 10 in an emergency setting, the alert setting of switch 70 is advantageous because it can be used as an alarm to indicate that power has been lost. Thus, the alert setting of switch 70 can be used in power critical situations, such as emergency rooms, construction sites, nursing homes, and the like. In other embodiments, the alert setting of switch 70 is used for an entirely different purpose. In such embodiments, the alert setting is used to tune the radio receiver to pick up special emergency broadcasts.

In some embodiments, apparatus 10 optionally further comprises weather band switch 90, in electrical communication with the radio receiver, disposed and held in housing 11. Weather band switch 90 controls which National Oceanic & Atmospheric Administration or Environment Canada weather station is received by the radio receiver when radio receiver switch 62 is set to NWR (WX). Weather band switch 90 allows a user to select any one frequency from the group consisting of 162.40 MHz, 162.42 MHz 162.45 MHz, 162.48 MHz, 162.50 MHz, 162.52 MHz, and 162.55 MHz.

In embodiments in which radio receiver receives AM, FM, and short wave, rather than television and NWR bands, apparatus 10 optionally further comprises a shortwave switch (not illustrated) instead of weather band switch 90, disposed and held in housing 11 and in electrical communication with the radio receiver. The shortwave switch controls which short wave frequency is received by the radio receiver when radio receiver switch 62 is set to the shortwave radio position (not illustrated in FIG. 1). Shortwave switch allows a user to select any one frequency in the following table:

TABLE 1

Frequency table for one embodiment of the invention

| Band Switch | Band (Meter) | Frequency Range (MHz) | Band Characteristics |
|---|---|---|---|
| SW1 | 49 m | 4.90–6.35 | Night band up to 8 am |
| SW2 | 41 m | 7.00–7.45 | Night band up to 8 am |
| SW3 | 31 m | 9.50–9.95 | Mainly a night band up to 8 am. Late afternoon in some areas |
| SW4 | 25 m | 11.65–12.05 | Mainly a night band up to 8 am. Later afternoon in some areas |
| SW5 | 22 m | 13.50–13.95 | Day band |
| SW6 | 19 m | 15.10–15.60 | Day band |
| SW7 | 16 m | 17.60–18.10 | Day band |

Apparatus 10 further comprises power switch 92 disposed and held in housing 11. Power switch 92 is in electrical communication with the radio receiver such that when power switch 92 is in a first position (e.g., "off position"), the radio receiver receives no direct current. When power switch 92 is in a second position (e.g., "dynamo/adapter"), the radio receiver receives direct current from a rechargeable battery source, dynamo, or input line jack. Furthermore, when power switch 92 is in third position (e.g., "battery") the radio receiver receives direct current from a nonrechargeable battery source.

Figure 3:
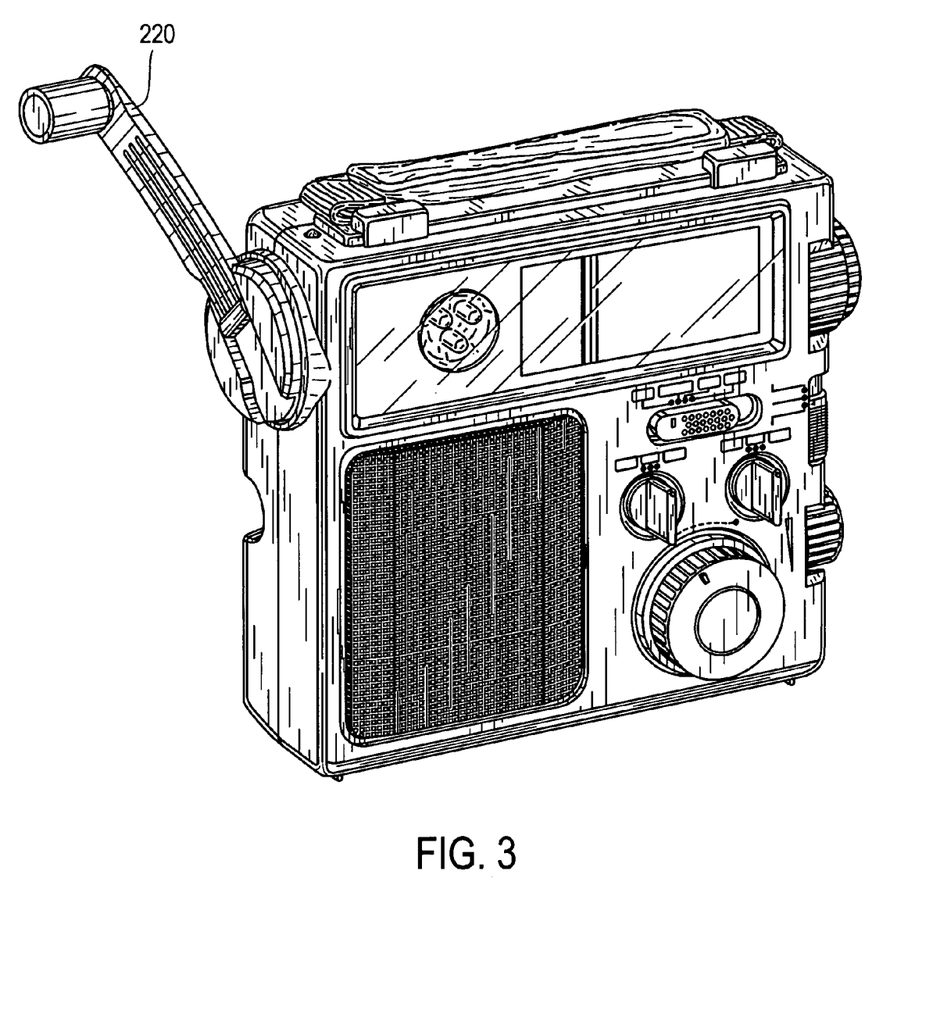
FIG. 3 is a front view of this preferred embodiment with a hand crank in an extended position.

Referring to FIG. 2, apparatus 10 includes output jack 66 for an ear piece. In some embodiments, output jack 66 supports stereo headsets by providing dual mono sound. Advantageously, when a headset is plugged into jack 66, the radio can use the headphone cord (not shown) as an antenna. In one embodiment of the present invention, when a headphone cord is inserted in headphone jack 66, the headphone cord is used by the radio as an antenna in instances where retractable telescopic antenna 64 is in the retracted position illustrated in FIG. 2. Further referring to FIG. 2, apparatus 10 includes a direct current input receptacle 240 for receiving a second source of direct current. In a preferred embodiment, the specifications for input receptacle 240 are five volts DC, negative polarity, 200 milliamperes current capability, with a plug tip outer diameter of 3.4 millimeters and an inner diameter of 1.3 millimeters. Advantageously, apparatus 10 further includes a cell phone charger jack 224 for charging cell phones. Power switch 92 is in electrical communication with cell phone charger jack 224 such that when power switch 92 is in a first position (e.g., "off"), cell phone charger jack 224 is energized and when power switch 92 is in a second position, cell phone charger jack 224 is not energized. Cell phone charger jack 224 can be used to charge a cell phone using two different methods. In a first method, the dynamo in apparatus 10 can be used. In this first method, power switch 92 is set to the off position. The cell phone is attached to cell phone charger jack 224 with a cell phone extension wire and correct plug tip for the cell phone. Then dynamo crank 220 is rotated either in a clockwise or counter-clockwise direction at a rate of about two turns per second. FIGS. 1 and 2 illustrate crank 220 when it is in a folded position whereas FIG. 3 illustrates crank 220 when it is in an extended position. The cell phone charging indicator on the cell phone will activate during this charging. In the second method, power switch 92 is set to the off position and the cell phone is attached to cell phone charger jack 224 with a cell phone extension wire and correct plug tip for the cell phone. Then an AC adaptor/charger connected to a house voltage source is plugged into direct current input receptacle 240.

Figure 4:
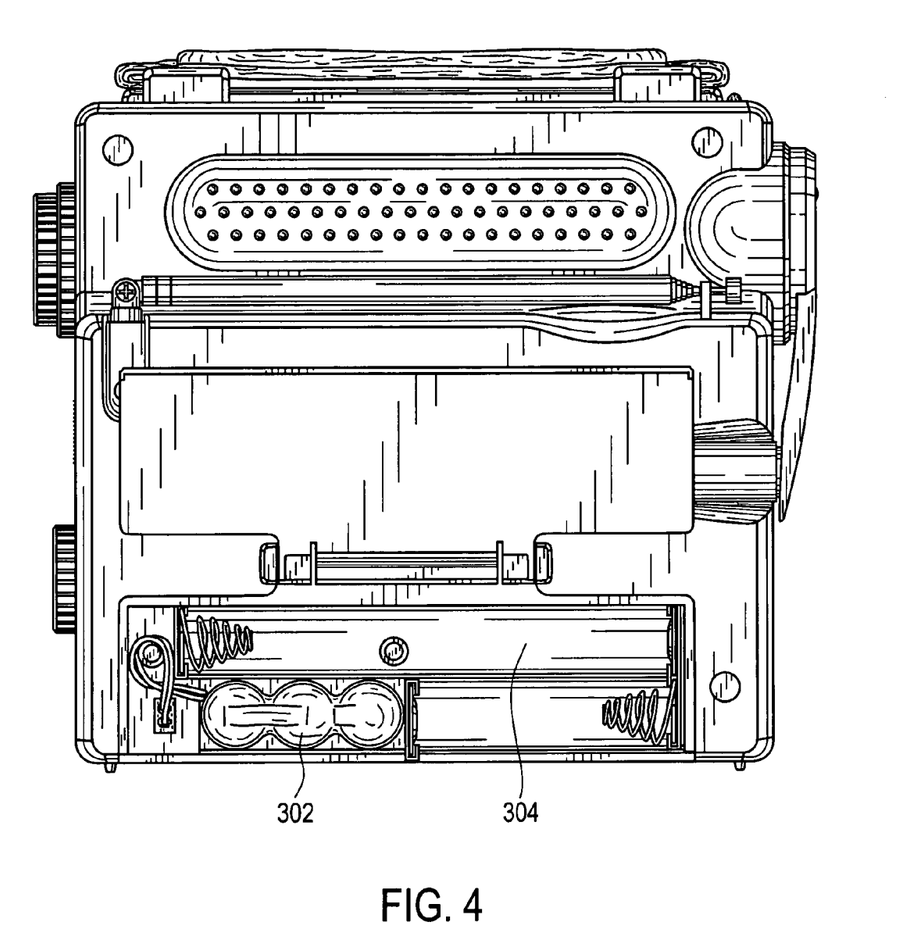
FIG. 4 is a rear view of this preferred embodiment illustrating a battery compartment.

Upon the occurrence of an emergency situation, such as a power failure or black-out, apparatus 10 can be energized by a direct current (DC) source, such as by rechargeable battery source 302 (FIG. 11). As illustrated in FIG. 4, battery compartment 304 serves to house battery pack 302. Battery pack 302 can comprise one or more batteries. The batteries in battery pack 302 are rechargeable. In some embodiments, the batteries in battery pack 302 are nickel-metal-hydride (Ni-MH) batteries. In some embodiments, such Ni-MH batteries have a voltage of about 3.6 volts DC and a milliamp-hour (mAh) rating between about 200 mAh and 800 mAh. Direct current input receptacle is connected to the rechargeable battery source so that, when the direct current input receptacle receives the second source of direct current, the second source of direct current recharges the rechargeable battery. Recharging power for battery pack 302 can be obtained from direct current input receptacle 240. In other words, battery pack 302 is constantly being recharged when apparatus 10 is provided with DC power through direct current input receptacle 240 so that, in the event of an emergency situation, illumination source 15 and the radio will readily be available to the user. Recharging power for battery pack 302 can also be obtained by a hand-crank dynamo. By cranking hand crank 220, a dynamo (not shown) provides electric current that can recharge battery pack 302.

In some embodiments, battery compartment further houses one or more non-rechargeable batteries and apparatus 10 further comprises a relay mechanism (not shown) connected to rechargeable battery pack 302 and the one or more non-rechargeable batteries, whereby the one or more non-rechargeable batteries supply direct current to other components of apparatus 10 (e.g., light 15 and the radio receiver) responsive to low voltage in rechargeable battery pack 302 and operation of the relay mechanism.

In some embodiments of the present invention, apparatus 10 is water resistant so that the apparatus can be used in a kitchen or bathroom. Further, in some embodiments of the present invention, apparatus 10 includes a smoke detector. In such embodiments, the smoke detector complements the other emergency features of apparatus 10 described above.

Many modifications and variations of this invention can be made without departing from its spirit and scope, as will be apparent to those skilled in the art. For example, reference has been made to an electric circuit, disposed and held in a housing, that is in electrical communication with a rechargeable battery source and direct current input receptacle to respectively receive direct current from a first or second source of direct current. Such an electric circuit can in fact be any number of circuits. In some embodiments, this circuit (or plurality of circuits) is commercially available circuitry that is mounted on a circuit board or breadboard. Exemplary circuitry is described in Scharz & Oldham, *Electrical Engineering*, Second Edition, 1993, Oxford University Press, Inc., New York, N.Y., which is hereby incorporated by reference in its entirety. The specific embodiments described herein are offered by way of example only, and the invention is to be limited only by the terms of the appended claims, along with the full scope of equivalents to which such claims are entitled.

All references cited herein are incorporated herein by reference in their entirety and for all purposes to the same extent as if each individual publication or patent or patent application was specifically and individually indicated to be incorporated by reference in its entirety for all purposes.

What is claimed:

1. An apparatus comprising:

a housing;

a rechargeable battery source disposed and held in said housing for providing a first source of direct current;

a hand-crank dynamo, disposed and held in said housing, wherein said hand-crank dynamo is configured to electrically replenish said rechargeable battery source;

a direct current input receptacle configured for receiving a second source of direct current;

an electric circuit disposed and held in said housing, said electric circuit in electrical communication with said rechargeable battery source and said direct current input receptacle to receive direct current from said first source of direct current or said second source of direct current;

a cell phone charger output jack disposed and held in said housing; wherein said cell phone charger jack is in electrical communication with said electric circuit;

a radio receiver, disposed and held in said housing, wherein said radio receiver is adapted to receive a National Oceanic & Atmospheric Administration or Environment Canada weather station, and wherein said radio receiver is in electrical communication with said electric circuit; and a power switch disposed and held in said housing, wherein the power switch is in electrical communication with said cell phone charger jack, and wherein when said power switch is in a first position, the cell phone charger jack is energized; and when said power switch is in a second position, the cell phone charger jack is not energized.

2. The apparatus of claim 1, wherein said rechargeable battery source is a nickel-metal-hydride (Ni-MH) battery pack.

3. The apparatus of claim 1, wherein said Ni-MH battery pack has a voltage of about 3.6 volts DC and a milli amp-hour (mAh) rating between about 200 mAh and 800 mAh.

4. The apparatus of claim 1 wherein said direct current input receptacle is connected to said rechargeable battery source so that, when said direct current input receptacle receives said second source of direct current, said second source of direct current recharges said rechargeable battery.

5. The apparatus of claim 1, further comprising a weather band switch disposed and held in said housing, wherein
the weather band switch is in electrical communication with said radio receiver,
the weather band switch controls which National Oceanic & Atmospheric Administration or Environment Canada weather station is received by said radio receiver, and
the weather band switch allows a user to select any one frequency from the group consisting of 162.40 MHz, 162.42 MHz 162.45 MHz, 162.48 MHz, 162.50 MHz, 162.52 MHz, and 162.55 MHz.

6. The apparatus of claim 1 wherein
when said power switch is in said first position, the radio receiver receives no direct current;
when said power switch is in said second position, said radio receiver receives said first source of direct current; and
when said power switch is in third position, said radio receiver receives said second source of direct current.

7. The apparatus of claim 1, further comprising:
an emergency switch;
a first light emitting diode for emitting a white light; and
a second light emitting diode for emitting a red light;
wherein the emergency switch, the first light emitting diode and the second light emitting diode are each disposed and held within the housing and are each in electrical communication with the electric circuit, and wherein
when said emergency switch is in a first position, said first light emitting diode is powered;
when said emergency switch is in a second position, said second light emitting diode is intermittently powered; and
when said emergency switch is in a third position, said first light emitting diode and said second light emitting diode is not powered.

8. The apparatus of claim 1, wherein said radio receiver is further capable of receiving AM, FM, and television band signals, the apparatus further comprising a radio receiver switch disposed arid held in said housing and in electrical communication with said electric circuit, wherein
when said radio receiver switch is in a first position, said radio receiver is adapted to receive an AM radio signal;
when said radio receiver switch is in a second position, said radio receiver is adapted to receive an FM radio signal;
when said radio receiver switch is in a third position, said radio receiver is adapted to receive a television band signal; and
when said radio receiver switch is in a fourth position, said radio receiver is adapted to receive said National Oceanic & Atmospheric Administration or Environment Canada weather station.

9. The apparatus of claim 1, further comprising
an alert switch disposed and held in said housing and in electrical communication with said electrical switch; and
a siren disposed and held in said housing and in electrical communication with said electrical switch; and wherein
when said alert switch is in a first position, a siren is not sounded; and
when said alert switch is in a second position, said siren is sounded.

10. The apparatus of claim 1, further comprising a retractable telescopic antenna and a ferrite bar antenna disposed and held within said housing, wherein said retractable telescopic antenna and said ferrite bar antenna are in electrical communication with said radio receiver.

11. The apparatus of claim 10, further comprising a headphone jack disposed and held within said housing and in electrical communication with said radio receiver, wherein, when a headphone cord is inserted in said headphone jack, said headphone cord is used by said radio as an antenna in instances where the headphone cord is inserted in the headphone jack and the retractable telescopic antenna is in a retracted position.

12. The apparatus of claim 1, further comprising a tuning dial disposed and held within said housing, wherein said tuning dial regulates a frequency to which said radio receiver is tuned and wherein said tuning dial comprises a course tuning dial for course control of the frequency and a fine tuning dial, housed within said course tuning dial, for fine control of the frequency.

13. The apparatus of claim 1, further comprising:
a nonrechargeable battery source disposed and held in said housing for providing a third source of direct current, and wherein
said electric circuit is in electrical communication with said nonrechargeable battery source in order to receive direct current from said first source of direct current, said second source of direct current, or said third source of direct current.

14. A weather channel receiver apparatus comprising:
a housing;
a rechargeable battery source disposed and held in said housing for providing a first source of direct current;
a hand-crank dynamo, disposed and held in said housing, wherein said hand-crank dynamo is configured to electrically replenish said rechargeable battery source;
a direct current input receptacle disposed and held in said housing, said direct current input receptacle configured for receiving a second source of direct current;
a nonrechargeable battery source disposed and held in said housing for providing a third source of direct current;
an electric circuit disposed and held in said housing, said electric circuit in electrical communication with said rechargeable battery source, said direct current input receptacle, and said nonrechargeable battery source to receive direct current from said first source of direct current, said second source of direct current, or said third source of direct current;

a cell phone charger output jack disposed and held in said housing; wherein said cell phone charger jack is in electrical communication with said electric circuit;

a radio receiver, disposed and held in said housing, wherein said radio receiver is adapted to receive a National Oceanic & Atmospheric Administration or Environment Canada weather station, and wherein said radio receiver is in electrical communication with said electric circuit; and a power switch disposed and held in said housing, wherein the power switch is in electrical communication with said cell phone charger output jack, and wherein when said power switch is in a first position, the cell phone charger output jack is energized; and when said power switch is in a second position, the cell phone charger output jack is not energized.

15. An apparatus comprising:

a housing;

a rechargeable battery source disposed and held in said housing for providing a first source of direct current;

a hand-crank dynamo, disposed and held in said housing, wherein said hand-crank dynamo is configured to electrically replenish said rechargeable battery source;

a direct current input receptacle disposed and held in said housing, said direct current input receptacle configured for receiving a second source of direct current;

an electric circuit disposed and held in said housing, said electric circuit in electrical communication with said rechargeable battery source and said direct current input receptacle to receive direct current from said first source of direct current or said second source of direct current;

a cell phone charger output jack disposed and held in said housing; wherein said cell phone charger jack is in electrical communication with said electric circuit;

a radio receiver, disposed and held in said housing, wherein said radio receiver is adapted to receive short-wave bands, FM bands, and AM bands, and wherein said radio receiver is in electrical communication with said electric circuit; and a power switch disposed and held in said housing, wherein the power switch is in electrical communication with said cell phone charger output jack, and wherein when said power switch is in a first position, the cell phone charger output jack is energized; and when said power switch is in a second position, the cell phone charger output jack is not energized.

16. The apparatus of claim 15, wherein said rechargeable battery source is a nickel-metal-hydride (Ni-MH) battery pack.

17. The apparatus of claim 16, wherein said Ni-MH battery pack has a voltage of about 3.6 volts DC and a milliamp-hour (mAh) rating between about 200 mAh and 800 mAh.

18. The apparatus of claim 15, further comprising:

an emergency switch;

a first light emitting diode for emitting a white light; and a second light emitting diode for emitting a red light; wherein the emergency switch, the first light emitting diode and the second light emitting diode are each disposed and held within the housing and are each in electrical communication with the electric circuit, and wherein when said emergency switch is in a first position, said first light emitting diode is powered;

when said emergency switch is in a second position, said second light emitting diode is intermittently powered; and when said emergency switch is in a third position, said first light emitting diode and said second light emitting diode is not powered.

* * * * *